Nov. 29, 1938.   C. F. CRUMB ET AL   2,138,536
MOWER
Filed June 19, 1937
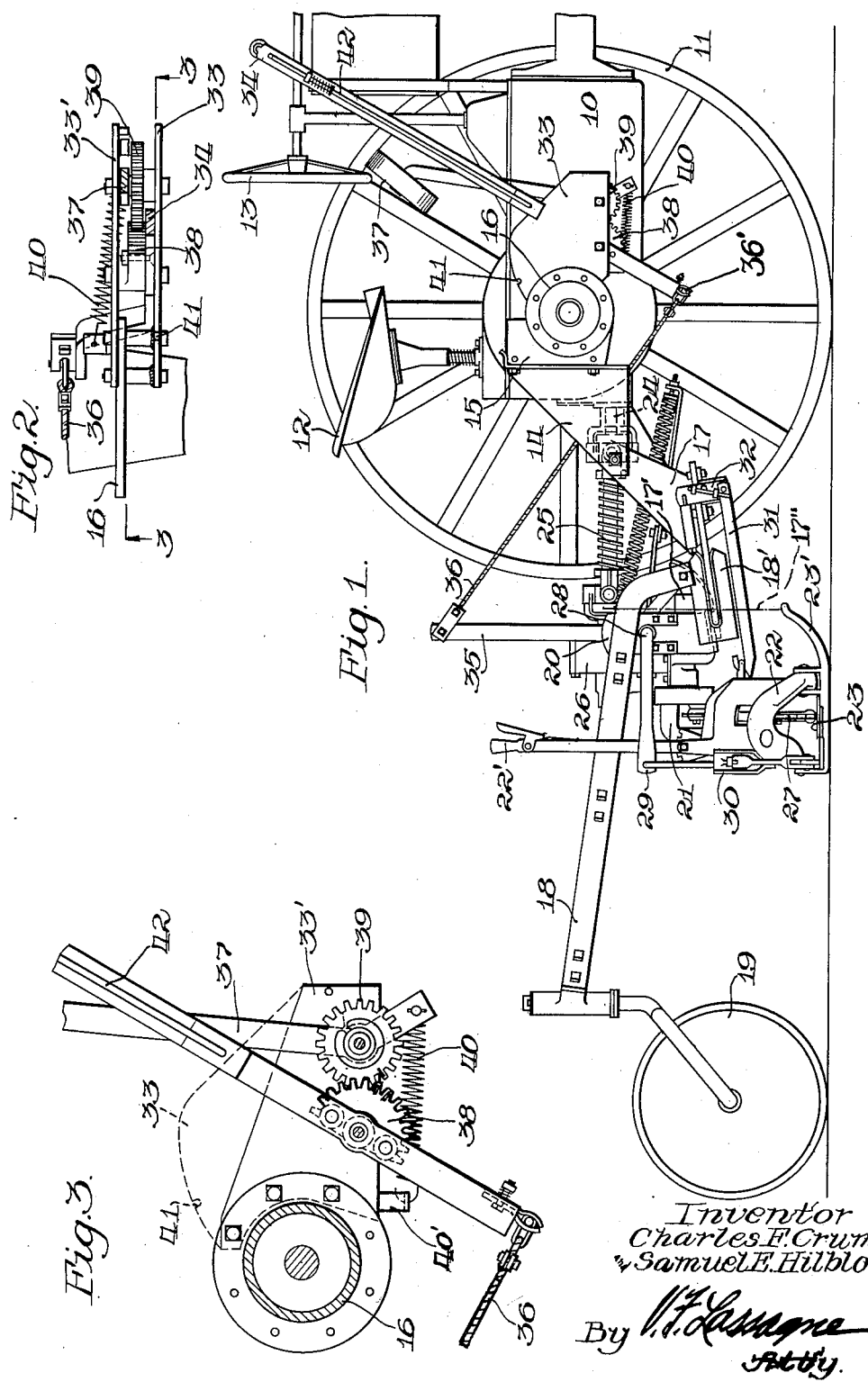
Inventor
Charles F. Crumb
 & Samuel E. Hilblom
By ... Attÿ.

Patented Nov. 29, 1938

2,138,536

UNITED STATES PATENT OFFICE 2,138,536

MOWER

Charles F. Crumb and Samuel E. Hilblom, Chicago, Ill., assignors to International Harvester Company, a corporation of New Jersey Application June 19, 1937, Serial No. 149,169

20 Claims. (Cl. 56—25)

This invention relates to a mower and more particularly to a lifting mechanism for the cutter bar thereof. According to the present invention, a mower is mounted at the rear of a tractor and a lifting mechanism is mounted on the tractor and connected to means for raising and lowering the cutter bar of the mower. However, the invention also contemplates the use of lifting mechanism for mowers of the horse drawn types.

In mowers of either the horse drawn or tractor mounted type, provision is made for mounting the mower on a frame structure in a manner permitting free vertical movement thereof within rather wide limits. Heretofore, difficulty was experienced in providing a lifting mechanism for the mower cutting mechanism that would not interfere with the freedom of movement of the mower. Also, other problems arose in attempting to locate a lifting mechanism within convenient reach of the operator, and, at the same time, maintain the controls for the lifting mechanism within reach of the operator while the mower assumed various positions as it followed the contour of the ground. In numerous instances, because of the vertical movement of the mower, the controls for the lifting mechanism would move out of reach of the operator, thus causing the operator no end of inconvenience in dismounting from the tractor or mower to move the controls back into operative position.

The principal object of the invention, therefore, is to provide an improved lifting mechanism for the cutter bar of a mower, said lifting mechanism incorporating interconnected controls either of which will raise the cutter bar.

An important object of the invention is to provide these controls or levers with interconnecting means so that operation of one will assist in operation of the other.

Another important object is to locate the control members within easy reach of the operator's station.

Another object is to provide a flexible lifting connection releasably connected at one end to the lifting mechanism and at the other end to connections on the mower for raising the cutting mechanism.

Still another object is to provide means for maintaining this flexible connection normally taut.

Still another object is to provide means interconnecting the two control levers for the lifting mechanism in such a manner that one of the levers will always be within easy reach of the operator as the tractor and mower follow the contour of the ground.

And still another object is to provide the lifting mechanism in such a manner that it will not interfere with the freedom of movement of the mower.

And still another object is to provide means associated with the lifting mechanism for permitting free movement of the levers over a limited distance, provision being made for locking the lifting mechanism when the cutter bar is in raised position.

Briefly and specifically, these and other objects are achieved by providing two control levers, one a hand lever and one a foot lever, pivotally attached to a plate carried on the tractor. A toothed member is carried by one lever and meshes with a toothed member carried by the other member whereby the levers operate simultaneously. The levers are mounted in such a manner with respect to the plate that they have free movement over a limited distance, there being, however, a notch in the plate to engage one of the levers for locking that lever in position when the cutter bar is raised. The mower is provided with a rockshaft having lifting connections to the mower cutter bar. A flexible connection is connected at one end to an arm on the rockshaft and at the other end to a releasable device on the hand lever of the lifting mechanism. This provision is made so that when the cutter bar strikes an obstruction and is swung back, the flexible connection may at the same time be released from the lifting mechanism.

A further understanding of the objects and desirable features of the invention may be had from the following description taken in conjunction with the accompanying sheet of drawings, in which:

Figure 1 is a general side elevation of a tractor mower, the near wheel of the tractor being removed and only that portion of the tractor shown as is necessary to illustrate a preferred construction and operation of the present lifting mechanism;

Figure 2 is an enlarged partial plan view of the component parts of the lifting mechanism showing the means for mounting the lifting mechanism on the tractor; and, Figure 3 is an enlarged side elevational view taken on the line 3—3 of Figure 2, indicating in dotted lines the general shape of the plate member for locking the lifting mechanism.

The particular type of construction to which the present invention is best applied is illustrated in the drawing as comprising a tractor mounted mower, best disclosed in applicants' copending application Serial No. 149,168, filed June 19, 1937, in which the tractor is of the general purpose type including a central body portion 10 supported on drive wheels 11. A centrally disposed seat or operator's station 12 is located in the usual position behind a steering wheel 13 adapted to steer the front wheels of the tractor, not shown. A supporting frame structure 14 is carried at the rear of the tractor by brackets 15 of the quick attachable type secured to rear axle housings 16 extending transversely of the tractor at either side of the central body portion 10. Pivotally connected to the supporting frame 14 on a horizontal axis and extending rearwardly therefrom is a draft frame 17. A mower frame 18 is pivotally connected at its forward end to the draft frame 17 by a bracket 17' for movement about a vertical axis as at 17", being further supported by a guide bracket structure 18', spaced transversely from the pivot axis 17', which cooperates with a releasable latch means to be hereinafter described. A caster wheel 19 supports the rear end of the mower frame 18.

A transverse frame structure 20 is rigidly carried by the mower frame structure and by the guide bracket 18'. The frame structure 20 carries at one side thereof a coupling bar 21 which extends transversely toward the grassward side of the mower frame and carries at its grassward end a yoke 22. A transversely extending cutter bar 23 is hingedly associated with the yoke 22. It will be understood that the foregoing and following description of the construction of the mower is more or less conventional and forms no part of the present invention.

The tractor is provided with a central, longitudinally extending power take-off shaft 24, which, through flexible shafting 25, drives mower drive mechanism 26 supported on the transverse frame structure 20. This drive mechanism drives the usual pitman 27 which reciprocates the usual cutting mechanism.

The transverse frame structure 20 carries in bracket portions at each end thereof a transverse rockshaft 28, which is formed at the grassward side of the mower with a rearwardly extending crank arm 29 connected to linkage 30 which is in turn operably connected to the cutter bar 23.

A releasable latch comprising a draft link 31 and latch means 32 is provided to connect the mower to the draft frame 17 in operative position.

From the foregoing description, it will be apparent that the mower frame and draft frame are so connected and so supported on the supporting structure 14 on the tractor and on the caster wheel 19 that the mower may have free vertical movement, within rather wide limits, about the pivotal connection of the coupling bar 21 with the mower frame 18 as the tractor and mower follow the contour of the ground. In as much as the rockshaft 28 is journaled in the frame structure 20, the cutter bar 23 may have similar movement to compensate for irregularities in the contour of the ground. The releasable latch, comprising the draft link 31 and latch means 32, cooperates with a pivotal connection, of conventional construction, for releasing the mower frame 18 from the draft frame 17 when the cutter bar 23 strikes an obstruction. A releasable latch means of this type is best disclosed in assignee's Patent No. 2,044,169, granted June 16, 1936. A hand adjusting lever 22' is provided for adjusting the tilt of the usual mower shoe 23' and cutter bar 23 carried thereby.

As previously mentioned, the above description is of a mower and release means illustrated merely for the sake of disclosure and that any type of mower or release means may be used in conjunction with the lifting mechanism of the present invention.

The lifting mechanism heretofore referred to comprises a pair of longitudinally extending plate members 33 and 33' carried by the tractor, being rigidly connected to an axle housing 16. A hand control lever 34 is pivotally carried by the plates 33 and 33' and extends therebelow. An upstanding arm 35 is rigidly connected to the rockshaft 28 of the mower and has connected to its upper end, one end of a flexible lifting connection 36, the other end of the connection being releasably attached to the lower end of the hand control lever 34, as at 36'. The means for making this releasable connection with the lever 34 may be any conventional device, as for instance, that shown in assignee's Patent No. 2,052,294, granted August 25, 1936. Also pivotally mounted on the plate 33 is a foot control lever 37. The pivot axes of the two levers are spaced transversely and the two levers are interconnected for simultaneous operation. The means for interconnecting the two levers comprises a toothed member 38 rigidly carried by the hand lever 34 and a toothed member 39 carried by the foot lever 37, the members 38 and 39 meshing and being rotatable about the respective axes of the levers, as best shown in Figure 3. It will be apparent that the construction provided by the interconnected control levers will facilitate the lifting operation of the cutter bar 23. In as much as the toothed members 38 and 39 mesh with each other, operation of either of the levers 34 or 37 will raise the cutter bar 23. Also, operation of one of the levers will assist in operation of the other lever. Means is also provided in the form of a coil spring 40 for interconnecting the levers in such a manner that the flexible connection 36 between the arm 35 on the rockshaft 28 and the lower end of the hand lever 34 is maintained normally taut. The spring 40 is shown as being connected at one end to the lower end of the foot lever 37 and at the other end to a member 40' on the plate 33, but the same operating advantages may be obtained were it connected between the foot lever 37 and the hand lever 34. For the purposes of disclosure it may be assumed that any manner of mounting the spring 40 or any construction equivalent thereto will suffice as a means toward the same end. The spring 40 also serves to maintain the position of one of the control levers within convenient reach of the operator's station or seat 12, for while the mower and tractor follow the contour of the ground, the positions of the levers will change in a reverse direction; that is, as the hand lever 34 moves forwardly about its pivot on the plate 33, the foot lever 37 will move rearwardly and closer to the operator's station 12 as the mower shoe 23' encounters a low spot in the contour of the ground.

As best shown in Figure 1 and as indicated in dotted lines in Figure 3, the plate member 33 provides for free movement of the hand lever 34 over a limited distance, the plate being cut out at its forward end, as shown. However, the rearward portion of the plate 33 is provided with an arc having as its center the pivot axis of the lever 34 on the plate. A notch 41 is provided in the plate at this point and cooperates with locking means 42 on the lever 34 for locking the lever in position when the cutter bar is raised for transport or for other purposes.

In the operation of the tractor mower, when the cutter bar 23 strikes an obstruction, the mower frame 18 is released from the draft frame 17 about the aforesaid pivotal connection, at 17", which may be of any conventional construction, provision for this rearward releasing of the mower frame being made by the latch means. At the same time, since the mower frame begins to move rearwardly, the flexible lifting connection 36 is released from the connection 36' at the lower end of the hand lever 34 and the mower frame 18 is permitted to swing back freely away from the draft frame 17. To connect the mower frame 18 with the draft frame 17, the tractor is backed and the guide bracket 18', previously referred to, guides the mower frame 18 into position on the draft frame 17 and the latch means is again connected.

It will be apparent from the foregoing that, while the above description pertains to a tractor mounted mower, the construction as illustrated and described is readily adapted for use in mowers of the horse drawn type. It will also be apparent that numerous alterations and modifications may be made in the above described construction without departing from the spirit and scope of the invention, as indicated in the appended claims.

What is claimed is:

1. In a mower attachment for connection to a tractor in which a support is carried on the tractor, a frame on the support, a coupling-bar pivoted to the frame, a yoke on the coupling-bar, and a cutter bar hingedly associated with the yoke, the combination with the cutter bar of lifting mechanism therefor comprising a lever movable on the tractor, connecting means between the lever and the cutter bar for raising the cutter bar, a second lever movable on the tractor, and means interconnecting the two levers interconnected with the first lever whereby operation of either of the levers operates the aforesaid connecting means for raising the cutter bar.

2. In a mower including a frame, a coupling-bar pivoted to the frame, a yoke on the coupling-bar, and a cutter bar hingedly associated with the yoke, the combination with the cutter bar of lifting mechanism therefor comprising a lever movably associated with the mower, connecting means between the lever and the cutter bar for raising the cutter bar, a second lever movably associated with the mower, and toothed members interconnecting said levers whereby operation of either of the levers operates the aforesaid connecting means for raising the cutter bar.

3. In a mower attachment for connection to a tractor in which a support is carried on the tractor, a frame on the support, a coupling-bar pivoted to the frame, a yoke on the coupling-bar, and a cutter bar hingedly associated with the yoke, the combination with the cutter bar of lifting mechanism therefor comprising a lever movable on the tractor, connecting means between the lever and the cutter bar for raising the cutter bar, a second lever movable on the tractor, and toothed members interconnecting said levers whereby operation of either of the levers operates the aforesaid connecting means for raising the cutter bar.

4. In a mower attachment for connection to a tractor in which a support is carried on the tractor, a frame on the support, a coupling-bar pivoted to the frame, a yoke on the coupling-bar, a cutter bar hingedly associated with the yoke, a rock-shaft supported on the frame, and means operably connected between the rock-shaft and the cutter bar, the combination wtih the rock-shaft of a lever movably carried on the tractor, a flexible connection between the lever and the rock-shaft for operating the aforesaid means to raise the cutter bar, a second lever movably carried on the tractor, and means interconnecting the two levers whereby operation of either of the levers raises the cutter bar.

5. In a mower attachment for connection to a tractor in which a support is carried on the tractor, a frame on the support, a coupling-bar pivoted to the frame, a yoke on the coupling-bar, a cutter bar hingedly associated with the yoke, a rock-shaft supported on the frame, and means operably connected between the rock-shaft and the cutter bar, the combination with the rock-shaft of a lever movably carried on the tractor, a flexible connection between the lever and the rock-shaft for operating the aforesaid means to raise the cutter bar, a second lever movably carried on the tractor, and toothed members interconnecting the levers whereby operation of either of the levers raises the cutter bar.

6. In a mower attachment for connection to a tractor in which a support is carried on the tractor, a frame on the support, a coupling-bar pivoted to the frame, a yoke on the coupling-bar, a cutter bar hingedly associated with the yoke, a rock-shaft supported on the frame, and means operably connected between the rock-shaft and the cutter bar, the combination with the rock-shaft of a lever movably carried on the tractor, a flexible connection between the lever and the rock-shaft for operating the aforesaid means to raise the cutter bar, a second lever movably carried on the tractor, and means interconnecting the two levers whereby operation of either of the levers raises the cutter bar, and means yieldably urging a portion of a lever in a direction away from the rock-shaft to maintain the flexible connection normally taut.

7. In a mower attachment for connection to a tractor in which a support is carried on the tractor, a frame on the support, a coupling-bar pivoted to the frame, a yoke on the coupling-bar, a cutter bar hingedly associated with the yoke, a rock-shaft supported on the frame, and means operably connected between the rock-shaft and the cutter bar, the combination with the rock-shaft of a hand lever and a foot lever movably carried on the tractor within reach of an operator's station thereon, a flexible connection between the rock-shaft and one of the levers for operating the aforesaid means to raise the cutter bar, means interconnecting the two levers whereby operation of either raises the cutter bar, and means associated with one of the levers and yieldably opposing movement thereof for maintaining the position of at least one of the levers substantially within reach of the operator's station while the cutter bar is in lowered position, said second named means also yieldably urging a portion of a lever in a direction away from the rock-shaft for maintaining the flexible connection normally taut.

8. In a mower attachment for connection to a tractor in which a support is carried on the tractor, a frame on the support, a coupling-bar pivoted to the frame, a yoke on the coupling-bar, a cutter bar hingedly associated with the yoke, a rock-shaft supported on the frame, and means operably connected between the rock-shaft and the cutter bar, the combination with the rock-shaft of a hand lever and a foot lever movably carried on the tractor within reach of an operator's station thereon, a flexible connection between the rock-shaft and one of the levers to raise the cutter bar, means interconnecting the two levers whereby operation of either operates the rock-shaft and the aforesaid means to raise the cutter bar, and means associated with one of the levers and yieldably opposing movement thereof for maintaining the position of one of the levers substantially within reach of the operator's station while the cutter bar is in lowered position.

9. In a mower attachment for connection to a tractor in which a support is carried on the tractor, a frame on the support, a coupling-bar pivoted to the frame, a yoke on the coupling-bar, and a cutter bar hingedly associated with the yoke, the combination with the cutter bar of lifting mechanism therefor comprising a lever movable on the tractor, connecting means between the lever and the cutter bar for raising the cutter bar, a second lever movable on the tractor, means interconnecting the two levers whereby operation of either of the levers operates the aforesaid connecting means for raising the cutter bar, and means associated with one of the levers for locking one lever in position when the cutter bar is raised.

10. In a mower attachment for connection to a tractor in which a support is carried on the tractor, a frame on the support, a coupling-bar pivoted to the frame, a yoke on the coupling-bar, and a cutter bar hingedly associated with the yoke, the combination with the cutter bar of lifting mechanism therefor comprising a lever movable on the tractor, connecting means between the lever and the cutter bar for raising the cutter bar, a second lever movable on the tractor, means interconnecting the two levers whereby operation of either of the levers operates the aforesaid connecting means for raising the cutter bar, and means associated with one of the levers for holding one of the levers in locked position when the cutter bar is raised and for permitting limited free movement of the lever as the cutter bar follows the contour of the ground.

11. In a mower including a frame, a coupling-bar pivoted to the frame, a yoke on the coupling-bar, and a cutter bar hingedly associated with the yoke, the combination with the cutter bar of lifting mechanism therefor comprising a lever movably associated with the mower, connecting means between the lever and the cutter bar for raising the cutter bar, a second lever movably associated with the mower, toothed members interconnecting said levers whereby operation of either of the levers operates the aforesaid connecting means for raising the cutter bar, and means associated with one of the levers for holding one of the levers in locked position when the cutter bar is raised and for permitting limited free movement of the lever as the cutter bar follows the contour of the ground.

12. In a mower including a frame, a coupling-bar pivoted to the frame, a yoke on the coupling-bar, and a cutter bar hingedly associated with the yoke, the combination with the cutter bar of lifting mechanism therefor comprising a lever movably associated with the mower, connecting means between the lever and the cutter bar for raising the cutter bar, a second lever movably associated with the mower, toothed members interconnecting said levers whereby operation of either of the levers operates the aforesaid connecting means for raising the cutter bar, and means associated with one of the levers for locking one lever in position when the cutter bar is raised.

13. In a mower attachment for connection to a tractor in which a support is carried on the tractor, a frame on the support, a coupling-bar pivoted to the frame, a yoke on the coupling bar, and a cutter bar hingedly associated with the yoke, the combination with the cutter bar of lifting mechanism therefor comprising a lever movable on the tractor, connecting means between the lever and the cutter bar for raising the cutter bar, a second lever movable on the tractor, toothed members interconnecting said levers whereby operation of either of the levers operates the aforesaid connecting means for raising the cuter bar, and means associated with one of the levers for locking one lever in position when the cutter bar is raised.

14. In a mower attachment for connection to a tractor in which a support is carried on the tractor, a frame on the support, a coupling-bar pivoted to the frame, a yoke on the coupling-bar, a cutter bar hingedly associated with the yoke, a rock-shaft supported on the frame, and means operably connected between the rock-shaft and the cutter bar, the combination with the rock-shaft of a lever movably carried on the tractor, a flexible connection between the lever and the rock-shaft to raise the cutter bar, a second lever movably carried on the tractor, and means interconnecting the two levers whereby operation of either of the levers assists operation of the other lever for raising the cutter bar.

15. In a mower attachment for connection to a tractor in which a support is carried on the tractor, a frame on the support, a coupling-bar pivoted to the frame, a yoke on the coupling-bar, a cutter bar hingedly associated with the yoke, a rock-shaft supported on the frame, and means operably connected between the rock-shaft and the cutter bar, the combination with the rock-shaft of a lever movably carried on the tractor, a flexible connection between the lever and the rock-shaft for operating the aforesaid means to raise the cutter bar, a second lever movably carried on the tractor, toothed members interconnecting the levers whereby operation of either of the levers assists operation of the other lever for raising the cutter bar, and means associated with one of the levers for locking one lever in position when the cutter bar is raised.

16. In a mower attachment for connection to a tractor in which a support is carried on the tractor, a frame on the support, a coupling-bar pivoted to the frame, a yoke on the coupling-bar, a cutter bar hingedly associated with the yoke, a rock-shaft supported on the frame, and means operably connected between the rock-shaft and the cutter bar, the combination with the rock-shaft of a hand lever and a foot lever movably carried on the tractor within reach of an operator's station thereon, a flexible connection between the rock-shaft and one of the levers for operating the aforesaid means to raise the cutter bar, means interconnecting the two levers whereby operation of either raises the cutter bar, and means associated with one of the levers and yieldably opposing movement thereof for maintaining the position of one of the levers substantially within reach of the operator's station while the cutter bar is in lowered position.

17. In a mower attachment for connection to a tractor in which a support is carried on the tractor, a frame on the support, a coupling-bar pivoted to the frame, a yoke on the coupling-bar, a cutter bar hingedly associated with the yoke, a rock-shaft supported on the frame, and means operably connected between the rock-shaft and the cutter bar, the combination with the rock-shaft of a hand lever and a foot lever movably carried on the tractor within reach of an operator's station thereon, a flexible connection between the rock-shaft and one of the levers for operating the aforesaid means to raise the cutter bar, means interconnecting the two levers whereby operation of either raises the cutter bar, means connected to one of the levers and yieldably opposing movement thereof for maintaining the position of one of the levers substantially within reach of the operator's station while the cutter bar is in lowered position, and means associated with one of the levers for locking a lever in position when the cutter bar is raised.

18. In a mower attachment for connection to a tractor in which a support is carried on the tractor, a frame on the support, a coupling-bar pivoted to the frame, a yoke on the coupling-bar, and a cutter bar hingedly associated with the yoke, said frame being releasable to swing back from the support when the cutter bar strikes an obstruction, the combination with the cutter bar of lifting mechanism therefor comprising a lever movable on the tractor, connecting means between the lever and the cutter bar for raising the cutter bar, a second lever movable on the tractor, and means interconnecting the two levers whereby operation of either of the levers raises the cutter bar, and means on the first lever for releasing the aforesaid connections when the frame swings back from the support.

19. In combination with a mower attachment for connection to a tractor in which the mower has a part adapted to be lifted and in which the tractor is provided with a rear axle housing having an attaching flange thereon, a pair of plate members secured to said flange in spaced relation, a pair of control levers pivotally carried between the plates, lifting connections connected between one of the levers and the mower part to be lifted, toothed members interconnecting the levers whereby operation of either lever assists in operation of the other for lifting said mower part, and means for locking one of the levers to one of the plate members.

20. In combination with a mower attachment for connection to a tractor in which the mower has a part adapted to be lifted and in which the tractor is provided with a rear axle housing having an attaching flange thereon, a pair of plate members secured to said flange in spaced relation, a pair of control levers pivotally carried between the plates, lifting connections connected between one of the levers and the mower part to be lifted, toothed members interconnecting the levers whereby operation of either of the levers will lift said mower part, and means for locking one of the levers to one of the plate members.

CHARLES F. CRUMB.
SAMUEL E. HILBLOM.